United States Patent Office 3,079,137
Patented Feb. 26, 1963

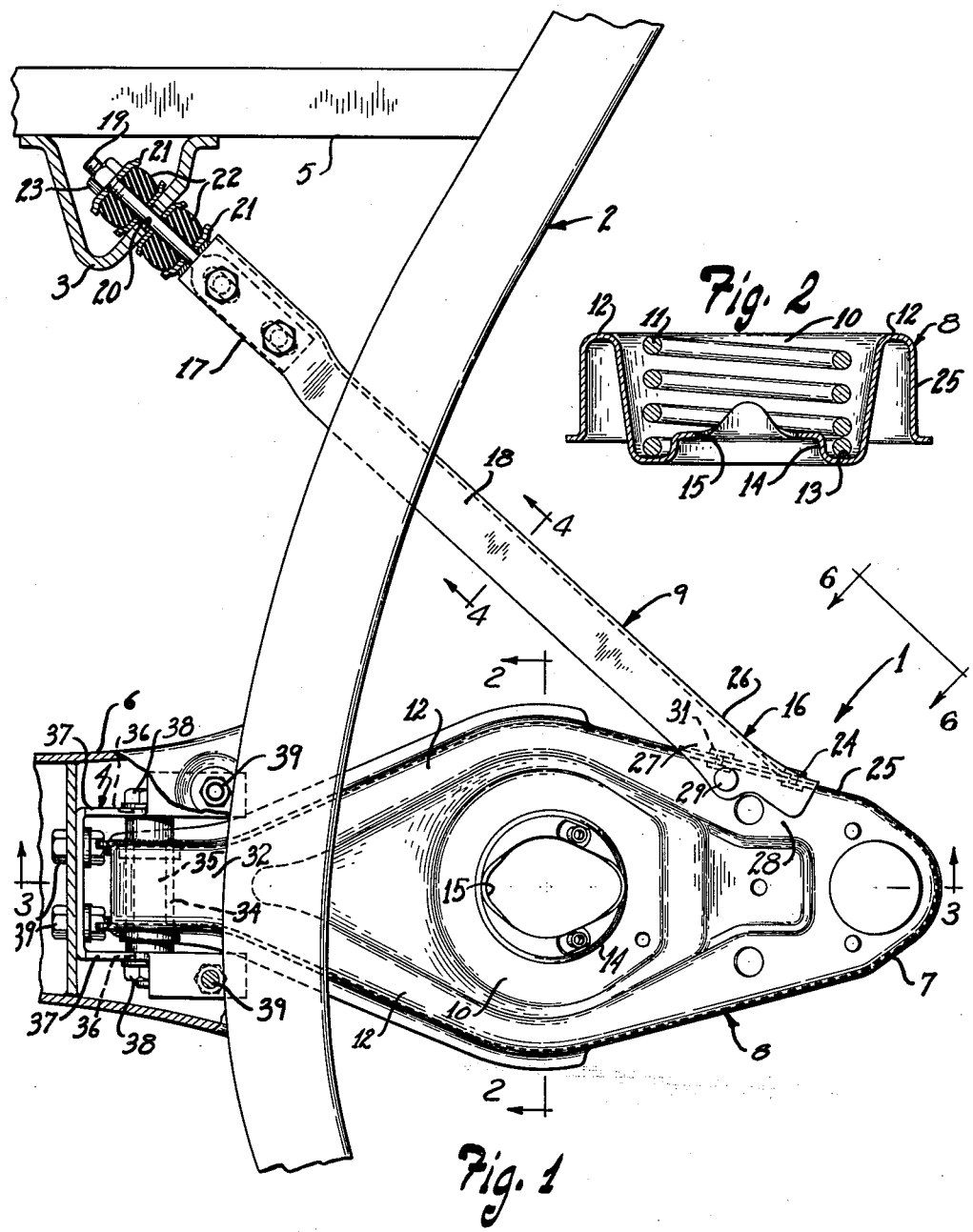

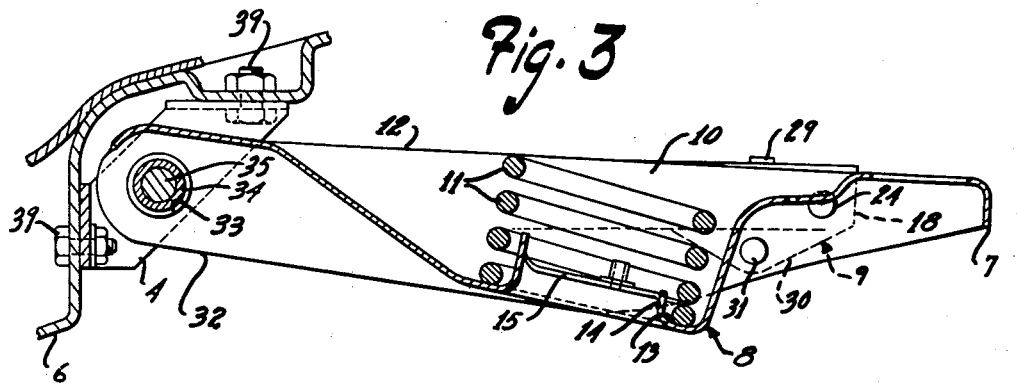
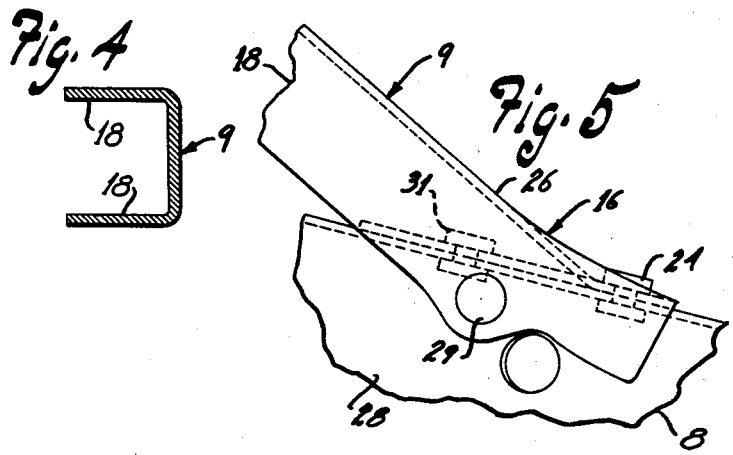
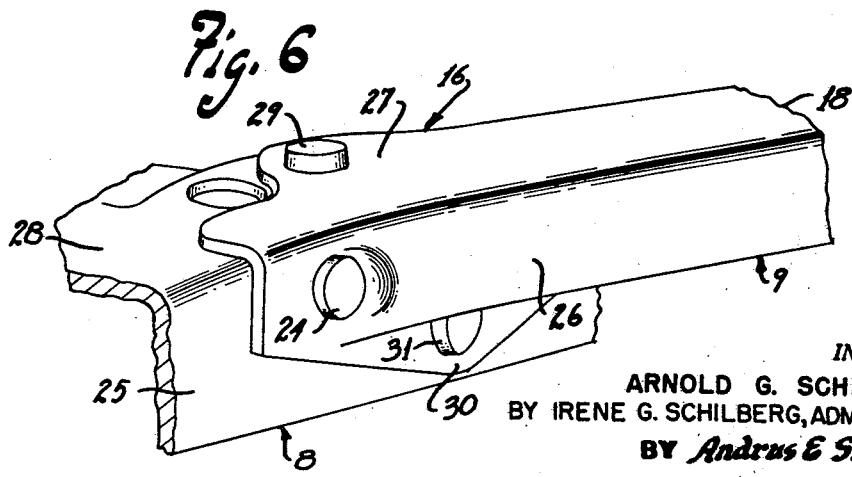

3,079,137
CONTROL ARM FOR VEHICLE WHEEL
SUSPENSION
Arnold G. Schilberg, deceased, late of Milwaukee, Wis.,
by Irene G. Schilberg, administratrix, Milwaukee, Wis.,
assignor to A. O. Smith Corporation, Milwaukee, Wis.,
a corporation of New York
Filed Apr. 10, 1961, Ser. No. 102,070
6 Claims. (Cl. 267—20)

This invention relates to an automotive wheel suspension and more particularly to a lower control arm for independent wheel suspension.

In general, an independent wheel suspension comprises an upper and lower control arm, each arm being pivotally attached at one side to the motor vehicle frame, and connected at its other end to the top and bottom of the wheel steering knuckle, respectively. The lower control arm usually has a coil spring or torsion spring operatively connected therewith and also connected to the vehicle frame to provide resilient suspension for the main vehicle mass.

The construction of the lower control arm may vary from a single, cast unit to a stamped unit comprising as many as five parts, welded or riveted together. If the suspension employs coil springs, the lower control arm usually has a spring seat centrally disposed in a triangularly shaped tray.

In the typical lower control arm, the tray is riveted or welded between two supporting legs disposed in a V-shape configuration. One leg of the control arm is generally a little longer than the other to cause the wheel to describe a radial oscillation path, and thereby give deflection absorbing capacity to the suspension as compared to a suspension having only a vertical oscillation characteristic.

Each control arm generally has three points of attachment, one point is attached to the wheel steering knuckle, and the other two points are pivotally attached to brackets welded on the vehicle frame. The frame brackets are generall equal in size and strength, and a pivot bar extends between the brackets and provides the pivotal attachment for the control arm.

A control arm having an integral spring seat can be made by conventional metal forming methods. As mentioned above, it is desirable to make the two legs of the control arms different lengths to provide radial oscillation of the wheel and greater bump absorbing capacity. Since the control arm is necessarily not symmetrical, right and left control arms must be made, requiring completely separate tooling to make the right or left control arms, if they are formed from a single metal blank.

The present invention relates to an improved control arm structure which comprises a symmetrical tray having an integral spring seat, and a relatively smaller drag strut connected to the tray and forming an angle therewith. The tray is made considerably stronger by providing integral channel reinforcing ribs along its sides, completely surrounding the spring seat. The reinforcing ribs adapt the tray to resist heavy vertical loads without the use of a heavy suspension element.

The control arm of this invention is economical to manufacture, because the tray is symmetrical, and only one set of tools is required to form the tray for use as the main component of either a right or left control arm. The drag strut, however, is preferably made as a right or left unit, and the point of attachment of the drag strut on the tray member determines whether the control arm is a right or left arm.

The drawings illustrate the best mode presently contemplated for carrying out the invention.

In the drawings:

FIGURE 1 is a plan view showing the front portion of a vehicle frame with the lower control arm attached thereto;

FIG. 2 is a sectional view taken on line 2—2 of FIGURE 1;

FIG. 3 is a sectional view taken on line 3—3 of FIGURE 1;

FIG. 4 is a sectional view taken on line 4—4 of FIGURE 1;

FIG. 5 is an enlarged plan view with parts broken away showing the attachment of the two main parts of the control arm; and FIG. 6 is an enlarged view taken along line 6—6 with parts broken away showing the connection between the two members which comprise the control arm.

As shown in the drawings, control arm 1 is pivotally connected to a vehicle frame 2 at brackets 3 and 4, located on cross members 5 and 6, respectively, of frame 2. The wheel mounting assembly, not shown, is connected to the outer end 7 of control arm 1.

The control arm 1 comprises a tray 8 and a drag strut 9. The tray 8 has a deep central recess 10 adapted to receive a coil spring 11. The tray 8 is bilaterally symmetrical when divided along the line 3—3 of FIGURE 1, and is formed from a flat metal blank. Because it is symmetrical, only one die pattern is required to make the trays 8 for both right and left control arms. The attachment position of the drag strut 9 determines whether the device will be a right or left hand control arm.

The tray also includes a pair of channel-shaped side portions 12 which straddle the central recess 10 and are merged together at the ends of the tray. The channel-shaped side portions 12 provide maximum reinforcement and strength at the central recess 10, the bottom of which defines an annular spring seat 13. The spring seat 13 includes an annular embossment 14 which is disposed inside the end of the coil spring 11 to prevent lateral displacement of the coil spring. Central opening 15 of the spring seat 13 provides clearance for the shock absorber mounting, not shown, and also serves as a further weight reduction without impairing the strength or rigidity of the tray 8.

The upper end of the coil spring 11 is secured in a downwardly opening cup, not shown, mounted on a side arm of the vehicle frame 2. The action of the coil spring 11 between the vehicle frame 2 and the control arm 1 provides an independent resilient suspension for the vehicle wheel.

The drag strut 9 is channel shaped in cross section, as shown in FIG. 4. The drag strut is secured at its outer end 16 to the outer end 7 of the tray 8 on the front of side portion 12, and extends diagonally forward to pivotally attach at its inboard end 17 to the bracket 3 on cross member 5 of the vehicle frame 2. The channel of the drag strut 9 opens toward the tray 8 so that the flanges 18 are horizontally disposed, thereby providing maximum stiffness to react against the twisting tendency of the tray 8 when it is subjected to horizontal loads.

The inboard end 17 of the drag strut 9 is pivotally connected to the bracket 3 through a stub bolt 19 which is secured in the inboard end 17 and extends diagonally therefrom through an opening 20 in the bracket 3. A pair of cup shaped washers 21 are disposed on the opposite sides of the opening 20 and are resiliently held in position by means of a pair of round rubber washers 22 disposed adjacent the cup shaped washers 21. The rubber washers 22 and the cup shaped washers 21 are held in bracket 3 by nut 23 threaded onto the end of the stub bolt 19. The opening 20 in the bracket 3 is sufficiently large so that the drag strut 8 is free to pivot as the tray 8 is subjected to road forces.

The outer end of the drag strut is riveted to the tray 8 as shown in FIGS. 5 and 6. The rivet 24 connects side flange 25 of the tray 8 to vertical web 26 of the drag strut 9. Top flange 27 of the drag strut 9 overlaps horizontal web 28 of the tray 8 and is connected thereto by means of rivet 29. The bottom of the drag strut flanges 18 is flattened out against the side flange 25 as indicated at 30 and is connected thereto by means of rivet 31, as shown in FIG. 6.

The riveted connection described above effectively transfers horizontal shear loads from the tray 8 to the frame 2 through the drag strut 9. By actual tests, the riveted connection has proven superior to a welded joint.

The tray 8 is pivotally connected at its inner end 32 to the bracket 4 on the cross member 6 of frame 2. The two side flanges 25 of the tray 8 converge toward the inner end 32. At the end 32, the flanges 25 are disposed parallel to each other and each has an opening 33 therethrough. The openings 33 are adapted to receive a bushing 34 which is welded in the openings 33. Bearing shaft 35 extends through bolt holes 36 in side flanges 37 of the bracket 4 and through the bushing 34 to pivotally connect the tray 8 to the frame cross member 6. The ends of bearing shaft 35 are threaded to receive lock nut and washer assemblies 38. The bracket 4 is partly welded to the cross member 6 and is also secured thereto by the bolt assemblies 39.

Fatigue tests were conducted to compare the relative fatigue strength of the welded joint and a riveted connection between the drag strut 9 and the tray 8. The control arms were loaded through their welded or riveted connections in a direction which would extend through the approximate center of the wheel attachment point. The arms were caused to oscillate, and the load was increased every 50,000 cycles until failure occurred.

The welded connections failed first, and tested at no better than 3125 lb. load force for 100,000 cycles oscillation. The riveted connections tested at an average of 4415 lb. load force for 100,000 cycles oscillation.

As mentioned above, the drag strut 8 is preferably channel shaped in cross section because a channel member will provide the best resistance to horizontal loading of the tray 8. However, the drag strut could also be a metal bar, or a metal tube. The outboard end of the drag strut should preferably be flattened and bolted or riveted to the top of the outboard end of the tray 8. A heavier rod or tube must be used, as compared to a channel member, to obtain the same resistance to horizontal shear loading that is offered by the more efficient channel member.

The control arm of this invention provides a relatively light weight, high strength component for a coil spring vehicle suspension. It is economical to manufacture because it includes an interchangeable, symmetrical tray having integral reinforcing ribs, and the tray may be used for either a right or a left control arm. In addition, the smaller drag strut member required little or no modification to adapt it for use as either a right or left control arm.

Various modes of the invention are contemplated as being within the scope of the following claims more particularly pointing out and claiming the subject matter which is regarded as the invention.

What is claimed is:

1. A control arm for independent coil spring suspension for a vehicle provided with a frame, which comprises a body member of symmethical shape about a longitudinal center line and having a recess adapted to receive the end of a coil spring, said body member having a pair of channel shaped portions surrounding said recess and merging together at the ends of said body member, said channel shaped portions providing rigidity for said body member, means for pivotally connecting one end portion of said body member to a vehicle frame, and a strut member rigidly secured to the opposite end portion of said body member and extending diagonally therefrom and being pivotally attached to the frame to stabilize the body member against horizontal loads on the coil spring suspension.

2. A control arm for independent spring suspension for a vehicle having a frame, comprising a body member adapted to be connected to the end of a spring, said body member having a pair of curved channel shaped portions extending the length of said body member and merging together at the ends thereof, said channel shaped portions providing rigidity for said body member, means for pivotally connecting one end portion of said body member to a vehicle frame, and a strut member rigidly secured to the opposite end portion of said body member and extending diagonally forward therefrom and pivotally attached to the frame at a point forward of the center of oscillation of the vehicle wheel to stabilize the body member against horizontal loads on the spring suspension.

3. A control arm for attachment to the frame of a vehicle for independent wheel suspension, which comprises a horizontally disposed, longitudinally symmetrical body member having a deep central recess for receiving the end of a vertically disposed coil spring, said recess being enclosed and reinforced by the longitudinally extending side portions of said body member, said side portions having channel shaped cross sections and merging together at both ends of said body member, and a channel shaped strut member having a vertical web and a top flange and a bottom flange and rigidly secured to the outer end of said body member, said strut member being disposed so that the channel opens towards the body member, and the inner end of said strut member being pivotally attached to the vehicle frame to stabilize the body member against horizontal loads on the coil spring.

4. The apparatus of claim 3, in which the bottom flange of the channel shaped strut member is flattened out at the outer end and disposed against one of said longitudinally extending side portions of said body member, and including a plurality of connecting members connecting the body member to the strut member through the flattened bottom flange, the web and the upper flange at the outer end of said strut member, respectively.

5. A control arm for independent coil spring suspension for a vehicle provided with a frame, which comprises a body member having a generally fish-shaped profile normally disposed horizontally in relation to a vehicle frame and having an inner and outer end, a reinforcing rib extending around the periphery of said body member, said rib being generally channel shaped in cross section and opening downwardly to provide reinforcement against horizontal loads on the suspension, means for pivotally connecting the inner end of said body member to the vehicle frame, a recess disposed centrally in said body member, the outer walls of said recess being defined by the inner flange of said reinforcing rib, said recess opening upwardly to receive the end of a coil spring, and a strut member secured at one end to the outer end of said body member and extending diagonally inwardly therefrom to pivotally connect to the vehicle frame to provide added stability to said body member to resist road impacts.

6. A control arm which comprises a body member having a top surface and side surface and having a wheel attachment end and a frame attachment end, a strut member connected to said body member and disposed to extend diagonally therefrom, said strut member having a channel shaped cross section including a web and a top flange and a bottom flange and said strut member disposed with the open side thereof facing toward said body member, an end portion of said strut member extending perpendicularly from the bottom flange and disposed against the side surface of said body member and secured thereto, a second end portion of said strut member extending angularly from the web portion thereof and also disposed against the side surface of said body member and secured thereto, and an end portion of the top flange of said strut member disposed against the top surface of said body member and secured thereto to provide connecting means between said body member and said strut member.

References Cited in the file of this patent

UNITED STATES PATENTS

| | | |
|---|---|---|
| 2,334,702 | Newton et al. | Nov. 23, 1943 |
| 2,707,100 | Schilberg | Apr. 26, 1955 |
| 2,916,282 | Muller et al. | Dec. 8, 1959 |